United States Patent [19]

Daly et al.

[11] 4,151,971
[45] * May 1, 1979

[54] SPEAKER MOUNTING SYSTEM

[75] Inventors: George W. Daly, Mill Valley; Joseph R. Rucker, San Francisco, both of Calif.

[73] Assignee: Mastermount Corporation, Petaluma, Calif.

[*] Notice: The portion of the term of this patent subsequent to Feb. 21, 1995, has been disclaimed.

[21] Appl. No.: 841,401

[22] Filed: Oct. 12, 1977

Related U.S. Application Data

[63] Continuation of Ser. No. 672,176, Mar. 31, 1976, Pat. No. 4,074,883.

[51] Int. Cl.² ............................................. A47F 5/00
[52] U.S. Cl. .................................. 248/286; 248/201; 248/279
[58] Field of Search ............... 248/279, 285, 286, 281, 248/201, 202, 296, 299, 188.5; 403/61, 56, 109, 110, 94

[56] References Cited

U.S. PATENT DOCUMENTS

| | | | |
|---|---|---|---|
| 531,257 | 12/1894 | Bono | 248/279 |
| 646,835 | 4/1900 | Jackson | 248/279 |
| 812,660 | 2/1906 | Lovegrove | 248/279 |
| 1,050,321 | 1/1913 | Winzenburg | 248/299 |
| 1,346,955 | 7/1920 | Eustafson | 248/188 |
| 2,697,776 | 12/1954 | Wale | 248/286 |
| 2,711,872 | 6/1955 | Lampke | 248/299 |
| 3,855,946 | 12/1974 | Bales | 248/188.5 |
| 4,074,883 | 2/1978 | Daly et al. | 248/286 |

Primary Examiner—Robert A. Hafer
Attorney, Agent, or Firm—Townsend and Townsend

[57] ABSTRACT

A device for mounting a speaker cabinet to various structural supports such as a wall, ceiling, floor or corner is disclosed. The device comprises a strut having two telescoping mutually rotatable members, and means for interlocking the members to fix the length and orientation of the strut. A flange having a plurality of apertures is fixed to one end of the telescopic strut for mounting the strut to the structural support. The configuration of the flange may be adapted to the shape of the structural support. In one embodiment, a flat flange is provided for mounting to planar support surfaces. In another embodiment, the flange includes a central planar portion and opposed inclined portions defining a 90° angle so that the flange can be used to mount the telescoping strut to a corner surface. A bracket is pivotably mounted to the other end of the strut and has a plurality of apertures for mounting to the speaker cabinet. One or more of the speaker mounting devices disclosed herein can be used to mount high fidelity speakers in various configurations in a variety of locations.

5 Claims, 5 Drawing Figures

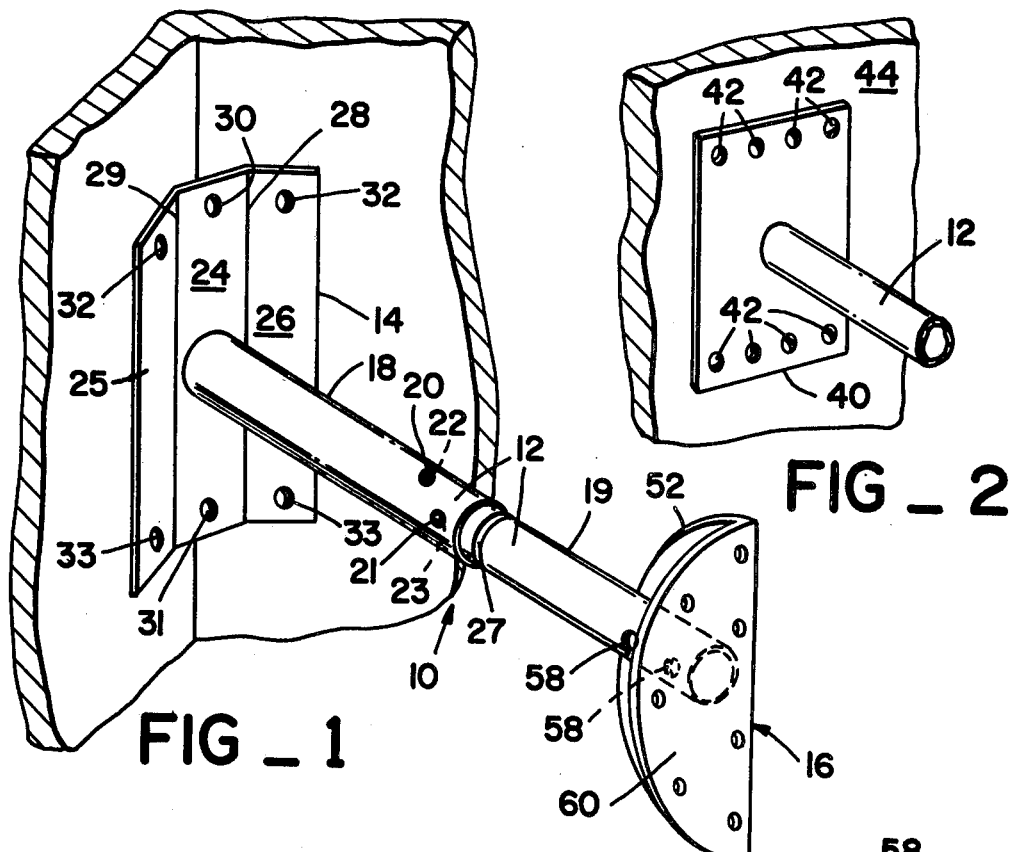
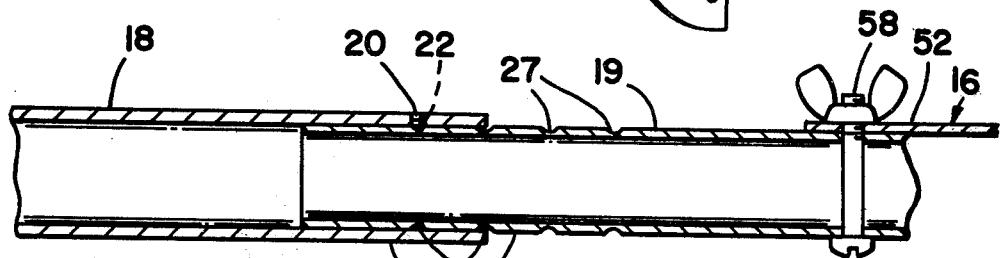
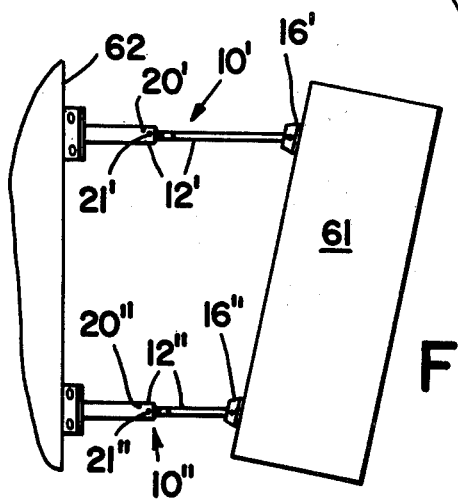
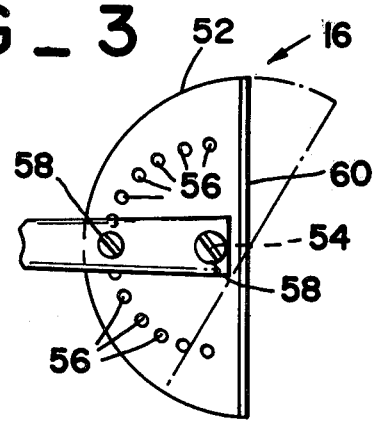

SPEAKER MOUNTING SYSTEM

This is a continuation of application Ser. No. 672,176, filed Mar. 31, 1976 now U.S. Pat. No. 4,074,883.

BACKGROUND OF THE INVENTION

The present invention relates to speaker mounting systems, and more particularly, to universal speaker mounting devices for mounting speaker cabinets to different support surfaces in a variety of configurations.

It is well known that the performance of high fidelity speaker systems is significantly effected by the placement and orientation of the speaker cabinets. The growing popularity of stereophonic and quadraphonic high fidelity systems employing two or four speaker systems, respectively, has rendered proper speaker placement and orientation even more important. Specifically, most high fidelity speaker systems are somewhat directional, making it desirable to orient the speaker toward the anticipated listener area. Such proper speaker orientation is often facilitated by mounting the speaker cabinet above floor level.

Known methods of installing high fidelity speakers so that they are located off the floor generally use standard hardware components such as hooks and eyes, wire, L-shaped brackets and so forth, and are relatively cumbersome. Speakers are quite difficult to mount and orient with such components and after they are so mounted, it is difficult to change their location or orientation. Also, such hardware components are often unsightly, and as a result of these and other reasons, high fidelity speakers used in the home are often located on the floor, and a loss of performance is merely tolerated.

SUMMARY OF THE INVENTION

The present invention provides a device for mounting a speaker cabinet to various structural supports such as a wall, ceiling, floor or corner. The device comprises a strut having two telescoping mutually rotatable members, and means for interlocking the members to fix the length and orientation of the strut. A flange having a plurality of apertures is fixed to one end of the telescopic strut for mounting the strut to the structural support. The configuration of the flange may be adapted to the shape of the structural support. In one embodiment, a flat flange is provided for mounting to planar support surfaces. In another embodiment, the flange includes a central planar portion and opposed inclined portions defining a 90° angle so that the flange can be used to mount the telescoping strut to a corner surface. A bracket is pivotally mounted to the other end of the strut and has a plurality of apertures for mounting to the speaker cabinet. One or more of the speaker mounting devices disclosed herein can be used to mount high fidelity speakers in various configurations in a variety of locations.

The primary advantage of the speaker mounting device of the present invention is its versatility, i.e. the number of locations and configurations in which a high fidelity speaker can be mounted using one or more of the devices. A relatively light to medium weight speaker can be mounted using only one of the devices of the present invention, or several such mounting devices can be used in various suspension arrangements, particularly adapted for relatively heavy speakers. After the speaker has been installed using the one or more of the mounting devices of the present invention, its position and orientation can often be changed by simply using the control features of the devices themselves without remounting either the devices or the speaker.

The flange by which the speaker mounting device of the present invention is mounted to a support surface preferably includes a plurality of laterally spaced apertures for mounting the device to a wall so that if the flange is inadvertently offset slightly from the wall stud during installation, one or more of the apertures will probably still align with the stud. The bracket by which the speaker is mounted to the device pivots, so that the angle of inclination of the speaker can be varied. Since the two members of the telescoping strut are rotatable, the bracket can be rotated horizontally, vertically or in any other desired manner and the speaker can thus be oriented in any direction.

The telescoping strut of the present invention is extensible so that the distance of the speaker from the support surface can be varied. Furthermore, if two or more devices of the present invention are used to mount a single speaker, the telescoping struts can be used to provide the desired inclination for the speaker. A pair of set screws, offset from each other, are provided on the telescoping strut to fix both the extension and rotation of the strut. Since two set screws are used and only one is required, ready access is provided to at least one of them regardless of the position of the speaker for easy adjustment of the mounting device.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a speaker mounting device according to the preferred embodiment of the present invention particularly adapted for corner mounting;

FIG. 2 is a perspective view of the flange portion of an alternative embodiment of the present invention particularly adapted for mounting to flat surfaces;

FIG. 3 is a cross-sectional view of the telescoping strut of the apparatus depicted in FIG. 1;

FIG. 4 is a side elevation view of the speaker mounting bracket portion of the apparatus depicted in FIG. 1; and FIG. 5 is a side elevation view depicting the mounting of a heavy speaker with two of the speaker mounting devices of FIG. 1.

A preferred embodiment of the speaker mounting device 10 of the present invention is illustrated in FIG. 1. Mounting device 10 includes a telescoping strut 12, a flange 14 at one end of the strut for mounting the strut to a structural support, and a bracket 16 at the other end of the strut for mounting a speaker cabinet to the strut. Strut 12 includes a pair of mutually extensible and rotatable members 18, 19, member 19 being of a smaller diameter than member 18 so that the two members can telescope relative to one another. A pair of set screws 20, 21 are threadably engaged in corresponding apertures 22, 23 in member 18. Either, or preferably both set screws 20 and 21 can be used to engage member 19 to control the relative extension and rotational position of the two members comprising telescopic strut 12.

As is apparent from viewing FIG. 1, bracket 14 includes a central portion 24 normal to the axis of telescopic strut 12, and a pair of side portions 25, 26 each inclined at an angle of 45° from the central portion. Inclined portions 25, 26 are integral to the central portion 24 along the lateral edges 28, 29 on the opposite sides of the central portion. A pair of apertures 30, 31 are formed in the central portion 24 of flange 14, and corresponding pairs of apertures 32, 33 are formed in each of the side portions 25, 26. While the preferred embodiment 10 of the speaker mounting device may be used to mount the speaker to a planar surface such as a wall, floor or ceiling, by inserting screws or nails through apertures 30, 31 in the central portion 24 of flange 14 to mount the device, the preferred embodiment 10 is particularly adapted to be mounted in a corner. As illustrated in FIG. 1, screws or nails are inserted through the apertures 32, 33 in the side portions 25, 26 of flange 14. Since each side portion 25, 26 is fixed to central portion 24 at a 45° angle, the two side portions in combination have an included angle of 90° so that the flange will fit flush with the two walls forming a corner and the device can easily be fixed thereto.

An alternate embodiment of the flange of the speaker mounting device of the present invention, better suited for mounting on a flat support surface, is illustrated at 40 in FIG. 2. In this embodiment, flange 40 comprises a single planar element mounted to the end of telescoping strut 12 normal to its central axis. Flange 40 includes a two dimensional array of apertures 42 through which screws or nails can be inserted to mount telescopic strut 12 to a planar support surface 44. The two dimensional array of apertures 42 not only provide increased purchase of flange 40 on support surface 33, but also allow for the insertion of a second nail or screw transversely spaced from the original such connector is a supporting wall stud has not been engaged by the first connector.

Referring to FIG. 3, the extension and rotation of members 18 and 19 of strut 12 will now be described in greater detail. Member 19 includes a plurality of annular grooves 27 disposed at spaced longitudinal locations. It is preferred that one of the set screws 20, 21 engage a groove 27 to positively lock the relative extension of the members 18, 19. In this manner, the speaker mounting device 10 may be employed in vertical orientation to suspend speakers from ceilings, without inadvertent extension of struts 12 under load. To facilitate engagement of one of the annular grooves 27 by one of the set screws 20, 21, set screws 20, 21 are longitudinally offset from one another by a distance preferably corresponding to approximately one-half of the longitudinal spacing between grooves 27. The number of discrete positions in which one of the set screws 20, 21 will properly engage one of the grooves 27 is thus equal to twice the number of grooves 27. In addition, set screws 20, 21 are angularly offset from one another, as illustrated in FIG. 1. In this manner, at least one of the set screws 20, 21 will generally be accessible, to facilitate adjustment of this speaker mounting device 10.

Referring now to FIGS. 1 and 4, the mounting of bracket 16 to tubular member 12 willl now be described in detail. One of the perpendicular flanges 52 of bracket 16 includes a pivot hole 54 and a plurality of mounting holes 56 disposed in an arc about pivot hole 54. Bracket 16 is mounted to the end of tubular member 19 by a pair of wing nut bolts 58 through the pivot hole 54 and one of the mounting holes 56 and respective holes through member 19. As is evident from viewing FIG. 4, bracket 16 is pivotable about pivot hole 54 and can be fixed in any pivoted position by proper selection of one of the mounting holes 56. The other flange 60 of bracket 16 includes a plurality of apertures through which nails or screws can be inserted to attach a speaker cabinet to the bracket. Member 19 of telescoping strut 12 can be rotated with respect to member 18 thereof and fixed in position by said screws 20, 21 to change the pivotal axis of bracket 16. Thus, bracket 16 can be pivoted in any direction using the wing nut bolts 58 and the set screws 20, 21.

An example of the use of two of the brackets 10', 10" of the present invention to mount a single speaker cabinet 61 to a wall 62 is illustrated by way of reference to FIG. 5. Device 10' is located relatively above device 10", and the extension of telescoping strut 12' is greater than that of 12". Bracket 16' 16" are each pivoted to the same angle relative to telescoping struts 12', 12" and are attached to speaker 61. The two devices 10', 10" thus mount speaker 61 in an inclined configuration to wall 62, and it is apparent that the inclination of the speaker cabinet and its distance from the wall can easily be altered by simply modifying the configuration of devices 10', 10" without remounting either the speaker cabinet or the support devices. If access to the set screws 20', 21' or 20", 21" is restricted by the speaker cabinet, only one of the set screws need be manipulated.

In operation, one or more of the speaker mounting devices 10 of the present invention can be used to mount a speaker cabinet to a wall, floor, ceiling or corner. The device or devices allow the cabinet to be mounted in any desired configuration. If the distance of the speaker from the support surface or the direction it faces is to be changed, the change can often be made without removing the speaker from the mounting devices or the mounting devices from the support surface. The devices of the present invention allow for mounting speakers in a suspended configuration rather than on the floor which significantly enhances their performance. Such mounting is done without resort to standard hardware components, which are often unsightly and allow for little modification of the speaker configuration once it is in place.

While preferred embodiments of the present invention have been illustrated in detail, it is apparent that modifications and adaptations of these embodiments will occur to those skilled in the art. However, it is to be expressly understood that such modifications and adaptations are within the spirit and scope of the present invention, as set forth in the following claims.

What I claim as new is:

1. A system for mounting a speaker cabinet having at least one planar surface to at least one planar structural support surface comprising:

a plurality telescoping struts, each strut including two mutually extensible members and means for releasably positively fixing the relative extension of the members;

a plurality of flanges, each flange fixed to one end of a strut and having at least one planar surface including a two dimensional array of apertures for receiving a plurality of fasteners to mount the strut the said at least one planar structural support surface;

a plurality of brackets, each bracket pivotably mounted to the other end of a strut and having at least one planar surface including a two dimensional array of apertures for receiving a plurality of fasteners to mount the strut to the at least one planar surface of the speaker cabinet; and means for releasably fixing the pivotal position of each bracket relative to the strut to which it is mounted;

whereby the inclination and proximity of the speaker cabinet relative to the at least one planar structural support surface can be altered by cooperatively adjusting the relative extension of the members and the relative pivotal positions of the brackets.

2. A system according to claim 1 wherein the means for releasably positively fixing the relative extension of the members of each strut comprises a first set screw threadably engaged in the outer member of the members adjacent one end thereof and adapted to engage the inner member of the members on demand, the inner member including a plurality of annular grooves adapted for engagement with the first set screw for positive engagement.

3. A system according to claim 2 comprising a second set screw threadably engaged in the outer member offset from the first set screw.

4. A system according to claim 1 wherein each bracket comprises a second planar surface having a pivot hole and a plurality of mounting holes disposed in an arc about the pivot hole and a pair of bolts through the pivot hole and a selected one of the mounting holes, respectively, to positively mount the bracket to the other end of a strut at a selected angular orientation.

5. A system according to claim 1 wherein each flange includes a central planar portion normal to the axis of the strut to which the flange is fixed, the central portion having opposed parallel lateral edges and a pair of planar side portions fixed to the central portion at the respective lateral edges at a substantially 45 degree angle so that the respective side portions have an included angle of 90 degrees, the side portions each having a plurality of apertures for receiving a plurality of fasteners to mount the strut to a corner structural support having two perpendicular planar structural support surfaces.

* * * * *